United States Patent
Walter et al.

[19]

[11] Patent Number: 6,064,199
[45] Date of Patent: May 16, 2000

[54] MAGNETIC FIELD CHANGE DETECTION CIRCUITRY HAVING THRESHOLD ESTABLISHING CIRCUITRY

[75] Inventors: William L. Walter, Arlington; A. Paul Brokaw, Burlington, both of Mass.

[73] Assignee: Analog Devices, Inc., Norwood, Mass.

[21] Appl. No.: 09/027,526

[22] Filed: Feb. 23, 1998

[51] Int. Cl.[7] .............................. G01B 7/30; G01R 29/02; G01R 33/07; F02P 5/00; H03K 17/30

[52] U.S. Cl. ................................. 324/207.2; 324/207.12; 324/207.25; 123/406.58; 327/511

[58] Field of Search ................................ 324/103 P, 166, 324/173, 174, 207.12, 207.2, 207.21, 207.23–207.25; 327/58, 62, 72, 510, 511; 123/406.58, 617

[56] References Cited

U.S. PATENT DOCUMENTS

| | | | |
|---|---|---|---|
| 4,575,677 | 3/1986 | Dennis | 324/166 X |
| 5,015,878 | 5/1991 | Lasagna et al. | 324/173 X |
| 5,221,250 | 6/1993 | Cheng | 324/174 X |
| 5,446,375 | 8/1995 | Perkins | 324/207.25 |
| 5,493,219 | 2/1996 | Makino et al. | 324/207.25 |
| 5,612,618 | 3/1997 | Arakawa | 324/207.25 |
| 5,777,465 | 7/1998 | Walter | 324/207.2 X |
| 5,917,320 | 6/1999 | Scheller et al. | 324/207.2 X |

FOREIGN PATENT DOCUMENTS 44 45 378 A1  6/1996  Germany ........................ G01B 7/30

OTHER PUBLICATIONS

"Magnetic Sensor TLE 4921–3U: Integrated and Dynamic", Components, vol. 31, No. 3, May 1, 1996, pp IV.

*Primary Examiner*—Gerard Strecker
*Attorney, Agent, or Firm*—Fish & Richardson P.C.

[57] ABSTRACT

Apparatus for detecting a tooth of a body. The tooth has an edge terminating in a notch. The tooth and notch are disposed along an edge of the body. The apparatus includes a pair of Hall effect cells disposed adjacent to, and laterally disposed along, the edge of the body. A magnet is positioned to provide a magnetic field through the edge of the body and Hall effect cells. The magnitude of field passing through the Hall effect cells is related to the relative position between the tooth and Hall effect cells. The Hall effect cells produce an output voltage related to magnitude of magnetic field passing through the cell. A differencing circuit is fed by the pair of Hall effect cell produced voltages for producing a difference signal having a peak when the edge of the tooth is positioned between the pair of Hall effect cells. A peak detector detects the peak produced by the difference signal. A threshold circuit is fed by the differencing signal for producing a gating signal when magnitude of the difference signal exceeds a threshold level. The gating signal enables peak detector produced pulse to pass to an output of the apparatus and inhibits such detected peak from passing to the output in the absence of such gating signal. A threshold level adjusting circuit is responsive to the difference signal for tracking maxima in the difference signal and establishing the threshold level of the threshold circuit in accordance with the tracked difference signal maxima.

15 Claims, 5 Drawing Sheets

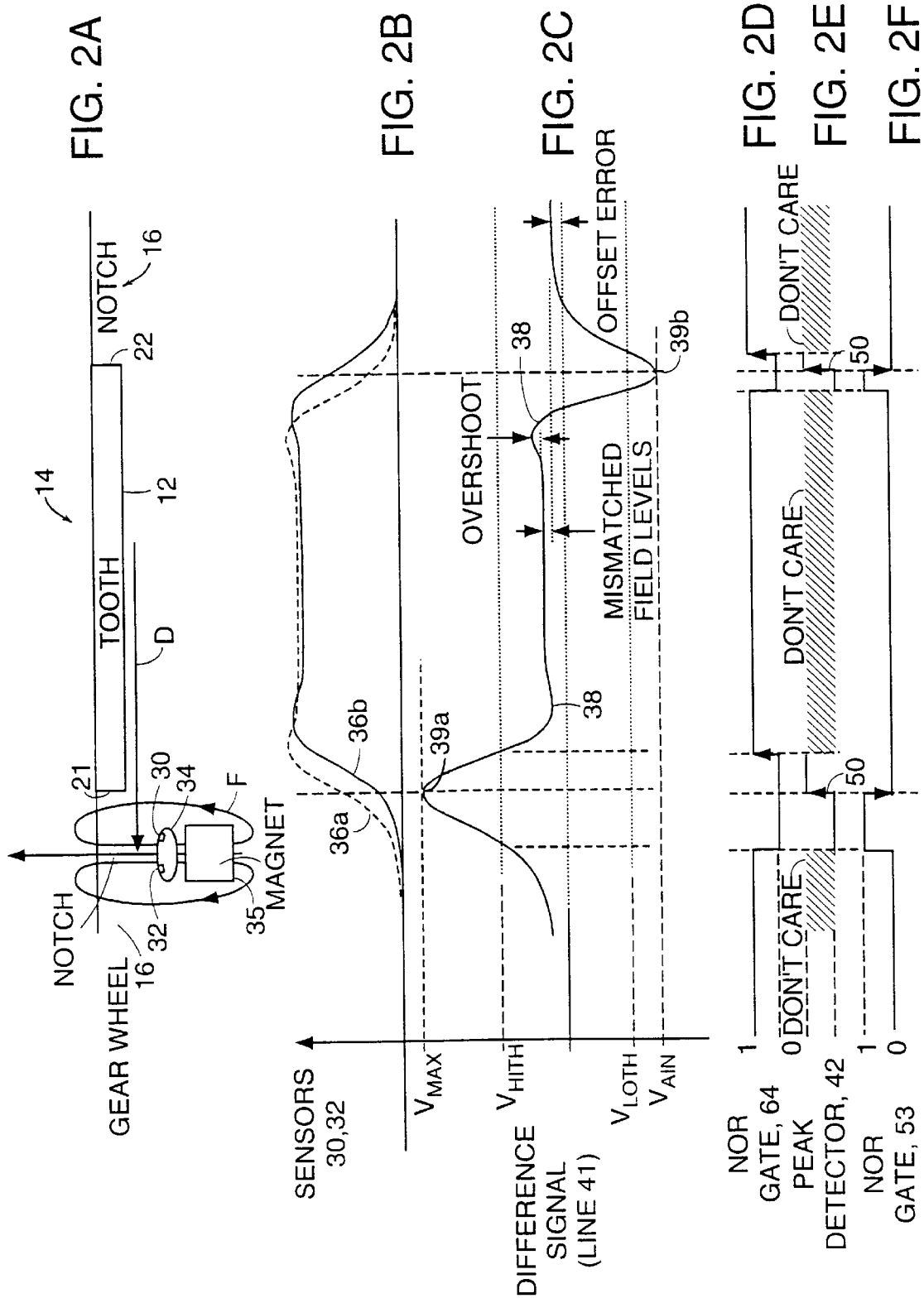

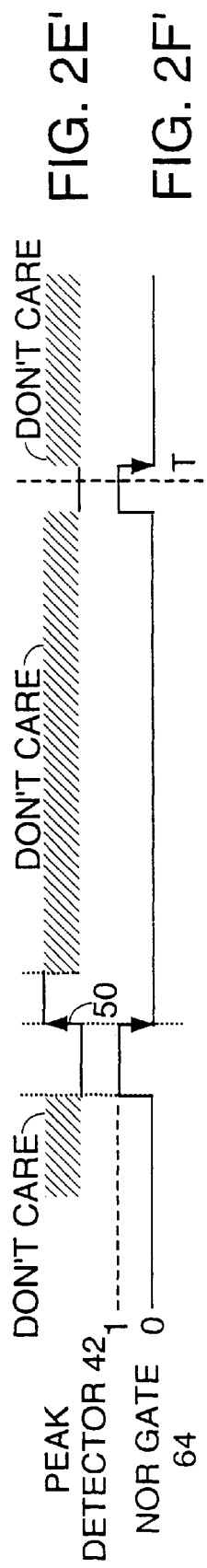
FIG. 2G
FIG. 2H
FIG. 2E'
FIG. 2F'
FIG. 2H'

006,064,199

MAGNETIC FIELD CHANGE DETECTION CIRCUITRY HAVING THRESHOLD ESTABLISHING CIRCUITRY

BACKGROUND OF THE INVENTION

This invention relates to magnetic field change detection circuitry and more particularly to circuitry adapted to generate a signal that indicates passage of a ferromagnetic marker through a magnetic field.

As is known in the art, magnetic field sensors have been used to detect passage of a ferromagnetic marker through a magnetic field. The magnetic field sensor produces an output related to the strength of the magnetic field passing through the sensor. One type of magnetic field sensor is a Hall effect cell. Thus, if the Hall effect cell is mounted to the marker and the marker moves relative to a magnet which produces a fixed magnetic field, the output of the Hall effect cell provides a measure of the relative position between the Hall effect cell and the magnet. Thus, in one application, the Hall effect cell may be fixed to an automobile engine and coupled to ignition timing circuitry for the engine while the magnet is affixed to the engine crank shaft. Thus, each time the crank shaft is properly positioned relative to the Hall effect cell, a timing pulse is produced by the Hall effect cell for the ignition system.

In another application, a gear is affixed to the crank shaft. The gear has disposed along its outer periphery a ferromagnetic tooth with edges terminating in a notch. The magnet and the Hall effect cell are fixed to the engine with the cell disposed between the magnet and the gear. The magnetic field is coupled to the Hall effect cell through the peripheral portion the gear. Thus, the strength of the magnetic field coupled to the Hall effect cell is a function of the relative position between the cell and the tooth. In one application, two Hall effect cells are used. The Hall effect cells are laterally spaced from each other along a direction of the path of tooth through the magnetic field. Thus, as the tooth passes one of the cells, the voltage produced by such cell increases, rises to some level and then decreases. The same voltage is produced by the other Hall cell, albeit delayed in time by $T=d/v$, where d is the lateral distance between the cells and v is the velocity of the tooth passing by the cells. The two signals produced by the cells are fed to a differencing circuit. Thus, the differencing circuit produces a pulse when the tooth edge passes between the pair of cells.

SUMMARY OF THE INVENTION

In accordance with the invention, apparatus is provided for detecting passage of a point on a body through a reference position. The apparatus includes a pair of magnetic field sensors disposed laterally along a direction of movement between the point on the body and the reference position. A magnet is aligned to provide a magnetic field through the reference position. Each one of the sensors is adapted to produce an output signal related to the magnetic field passing such sensor. A differencing circuit is fed by the output signal produced by each one of the sensors. The differencing circuit produces a difference signal having a peak when the point on the body is positioned between the pair of sensors. A peak detector detects the peak in the difference signal and produces a pulse in response to such detected peak. A threshold circuit is provided for producing a gating signal when the magnitude of the difference signal exceeds a threshold level. An output logic gate is provided. The gating signal enables the output logic gate to pass the peak detector produced pulse to pass to an output of the apparatus and inhibits such detected peak from passing to the output of the apparatus in the absence of such gating signal. A threshold level adjusting circuit is provided for establishing the threshold level in accordance with the level of the difference signal.

In accordance with another feature of the invention, the threshold level adjusting circuit determines the maximum value of the difference signal in establishing the threshold level.

In accordance with another feature of the invention, the threshold level adjusting circuit tracks the maximum value of the difference signal.

In accordance with still another feature of the invention, the threshold level adjusting circuit includes: a network for producing an estimate of the maximum value of the difference signal; a comparator for comparing the estimate of the difference signal with the difference signal; and an adder network for incrementing or decrementing the estimate of the maximum value of the difference signal in accordance with the comparison made by the comparator.

In accordance with another feature of the invention, the threshold level adjusting circuit includes: an oscillator. The adder network increments the estimate of the difference signal in response to pulses produced by the oscillator during an initial calibration mode until the maximum of the difference signal is determined and increments or decrements the estimate of the maximum value of the difference signal in accordance with the comparison made by the comparator during a subsequent maximum difference signal tracking mode.

In accordance with still another feature of the invention, the threshold circuit fed by the differencing signal produces a termination gating signal when the magnitude of the difference signal is less than a minimum threshold level. The output logic gate, in response to the gating signal, enables the peak detector produced pulse to pass to an output of the apparatus and inhibits such detected peak from passing to the output of the apparatus in the absence of such gating signal.

The threshold level adjusting circuit is responsive to the difference signal for tracking both the maximum and minimum levels in the difference signal and establishes the maximum and minimum threshold levels of the threshold circuit in accordance with the tracked difference signal maximum and minimum levels.

In accordance with yet another feature of the invention, the threshold level adjusting circuit includes: a network for producing an estimate of the maximum and minimum values of the difference signal; a comparator for comparing the estimate of the maximum value of the difference signal and the estimate of the minimum value of the difference signal with the difference signal; and adder network for incrementing or decrementing the estimate of the maximum value and the estimate of the minimum value of the difference signal in accordance with the comparison made by the comparator to track the maximum and minimum levels of the difference signal.

BRIEF DESCRIPTION OF THE DRAWING

These and other features of the invention, as well as the invention itself, will become more readily apparent from the following description taken together with the accompanying drawings, in which:

FIGS. 2A–2H are diagrams useful in understanding the apparatus of FIG. 1;

FIGS. 2E', 2F', and 2H' are modifications to FIGS. 2F, 2F and 2H to illustrate an effect of the apparatus of FIG. 1 under a specific operating condition;

DESCRIPTION OF THE PREFERRED EMBODIMENTS

Figure 1:
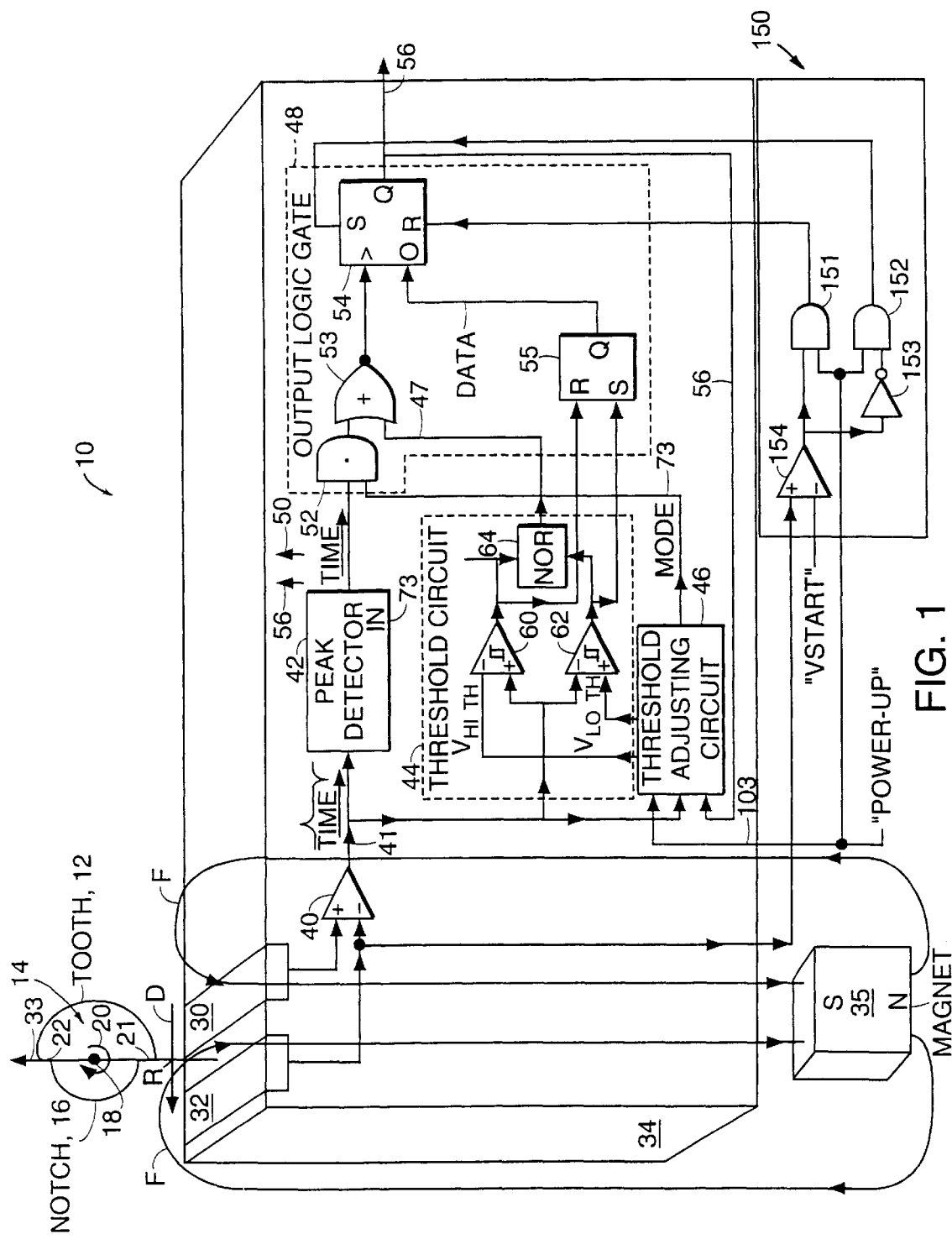
FIG. 1 is a block diagram of magnetic field change detection apparatus according to the invention.

Referring now to FIG. 1, apparatus 10 is shown for generating a signal that indicates passage of a marker through a magnetic field, F. Here, the marker is a tooth 12 of ferromagnetic material disposed on a body, here a gear 14. The gear 14 is adapted for mounting to a crank shaft 18 of an automobile engine, not shown. Thus, as the crank shaft 18 rotated about its axis, the gear 14 rotates, here clockwise, as indicated by the arrow 20. The tooth 12 of gear 14 is disposed on the outer peripheral portion of the gear 14. Edges 21, 22 of the tooth 12 terminate in a notch 16, as shown. As noted above, the tooth 12 is here ferromagnetic material. The notch 16 is an air gap in the outer periphery of the gear 14.

The apparatus 10 includes a pair of magnetic field sensors 30, 32, here Hall effect cells, disposed in a semiconductor body 34, as indicated. The sensors 30, 32 are laterally along a direction, D, of movement between the tooth 12 and the pair of magnetic field sensors 30, 32. The apparatus 10 includes a permanent magnet 35. The magnet has north and south poles (N,S) and is fixed relative to the sensors 30, 32. The magnet 35 produces the magnetic field, F, as indicated. In the region R between the outer periphery of the gear 14 and the sensors 30, 32, the magnetic field, F, is normal to the direction, D, (i.e., is normal to the face of the sensors 30, 32). Thus, the magnet 35 is disposed at the reference position to provide the magnetic field through the body (i.e., gear 14) and the pair of magnetic field sensors 30, 32, as indicated. As noted above, the magnet 35 and the pair of sensors 30, 32 are fixed relative to each other. The magnet 35 produced magnetic field is directed along a sensor axis 33 passing between the sensors 30, 32. Such sensor axis 33 is normal to the direction of motion between the sensors 30, 32 and the tooth 12 in the region R and provide a reference for the apparatus 10. The magnitude of the field, F, passing through the body 14 and each one of the pair of sensors 30, 32 is related to the relative position between the tooth 12 and such one of the pair of sensors 30, 32.

Referring to FIG. 2A the relationship between the sensors 30, 32, magnet 35 and the tooth 12, notch 16 of gear 14 is shown diagrammatically. Each one of the pair of sensors 30, 32 produces an output signal related to the magnitude of the magnetic field passing such one of the sensors 30, 32. The output signals produced by the sensors 30, 32 are shown in FIG. 2B, by curves 36a and 36b, respectively. It is noted that a change in the magnetic field is produced through the sensors 30, 32 as the tooth 12 passes by the sensors 30, 32. The distance separating the sensors 30, 32 is set so that tooth terminating edge-notch transition events seen by the sensors 30, 32 overlap, as indicated in FIG. 2B. Thus, as indicated, the difference between the signals (FIG. 2C) produced by the sensors 30, 32 peaks 39a, 39b when terminating edges 21, 22, respectively, of the tooth 12 pass by the sensors 30, 32, as shown in FIGS. 2A and 2B. It is noted that the difference signal shown in FIG. 2C has overshoots 38 in addition to peaks 39a, 39b.

Referring again to FIG. 1, a differencing circuit 40, formed in the semiconductor body 34 is fed by the output signal produced by each one of the sensors 30, 32. As noted above, the difference signal on line 41 is shown in FIG. 2C and has peaks 39a, 39b when tooth edges 21, 22, respectively, are positioned between the pair of sensors 30, 32 (i.e., along the sensor, or reference axis 33). An offset or gain change in the magnetic field has very little effect on the position of the peaks 39a, 39b. Thus, a peak detector 42 (FIG. 1), also formed in the semiconductor body 34, is provided for detecting the peaks 39a, 39b in the difference signal on line 41. The output pulses 50 of the peak detector 42 are shown in FIG. 2E. (It is noted that the peak detector 42 here, in this embodiment, includes a rectifying arrangement which inverts the polarity of the 2 negative going pulses 39b so that all pulses 50 produced by the peak detector 42 are positive going, as indicated in FIGS. 1 and 2E). For accuracy, the apparatus 10 is designed to have the smallest threshold possible. The larger the threshold the larger the angular error due to changing signal level. Since peak detection is an AC function, slowly varying difference signal offsets (i.e., magnetic sensor drift with changes in temperature) have very little effect on accuracy.

A threshold, or windowing, circuit 44 (FIG. 1) is provided for producing a gating signal on line 47 for output logic gate 48 when the magnitude of the difference signal on line 41 (FIGS. 1 and 2C) exceeds the threshold level. The gating signal on line 47 enables the peak detector 42 produced pulse 50 (FIG. 2E) to pass to an output 56 of the apparatus 10 and inhibits such peak detector 42 produced pulses 50 from passing to effect the output 56 (FIG. 2H) of the apparatus 10 in the absence of such gating signal on line 47. A threshold level adjusting circuit 46 establishes the threshold level in accordance with the magnitude of the difference signal on line 41 in a manner to be described in more detail in connection with FIG. 3. Suffice it to say here, however, that the threshold level adjusting circuit 46 determines the levels of the peaks 39a, 39b (FIG. 2C), i.e., the maximum and minimum ($V_{MAX}$, $V_{MIN}$, respectively) values of the difference signal on line 41 (FIGS. 1 and 2C) in establishing the threshold level. The threshold level adjusting circuit 46 tracks the maximum and minimum ($V_{MAX}$, $V_{MIN}$, respectively) of the difference signal on line 41 and from such tracked $V_{MAX}$ and $V_{MIN}$ establishes upper and lower threshold levels $V_{HI\ TH}$ and $V_{LO\ TH}$ for the threshold circuit 44.

The threshold circuit 44 includes a pair of comparators 60, 62 both fed by the difference signal on line 41. Comparator 60 has its negative input fed by $V_{HI\ TH}$ and comparator 62 has its positive input fed by $V_{LO\ TH}$, as indicated. The comparators 60, 62 have hysteresis, as indicated. The outputs of the comparators 60, 62 are fed to a NOR gate 64. The output of NOR gate 64 is shown in FIG. 2D. Thus, if the level of the difference signal on line 41 is greater than $V_{HI\ TH}$ the output of the comparator 60 is a logic 1; otherwise the output is logic 0. If the level of the difference signal on line 41 is less than $V_{LO\ TH}$ the output of the comparator 62 is a logic 1; otherwise the output is logic 0. As noted above, the output of NOR gate 64 is shown in FIG. 2D. The pulse 50 produced by the peak detector 42 (FIG. 2E) passes to effect the output 56 (FIG. 2H) of the output logic gate 48 only when the level of the difference signal on line 41 is greater than $V_{HI\ TH}$ or less than $V_{LO\ TH}$, as indicated in FIG. 2D. To put it another way, the NOR gate 64 indicates when the difference signal on line 41 is outside the upper (i.e., higher) and lower threshold $V_{HI\ TH}$ and $V_{LO\ TH}$. The peak detector 42 produced pulse 50 is ignored when the difference signal is between $V_{HI\ TH}$ and $V_{LO\ TH}$. The peak detector 42 produced pulse 50 is allowed to effect the output 56 (FIG. 2H) during the normal operating mode only when the difference signal is outside $V_{HI\ TH}$ or $V_{LO\ TH}$ (i.e., the peak detector output is passed to the output of the apparatus only when the difference signal has a level greater than $V_{HI\ TH}$ or a level below $V_{LO\ HI}$ as indicated in FIG. 2H. The output logic gate 48 implements the described function in a manner to be described. Suffice it to say here, however, that the output logic gate 48 (FIG. 1) includes: an AND gate 52 fed by the output of the peak detector 42 and by a mode condition signal on MODE signal line 73; a NOR gate 53 fed by the output of the AND gate 52 and the output of the threshold circuit 44; a D flip/flop 54 with its clock input fed by the output of the NOR gate 53; a set (S)/reset (R) flip/flop 55 having its set (S) and reset (R) inputs fed by the threshold circuit 44, as shown. The Q output of D flip/flop 55 is fed to the D input of flip/flop 54. The Q output of D flip/flop 54 provides the output 56 of the apparatus 10.

Figure 3:
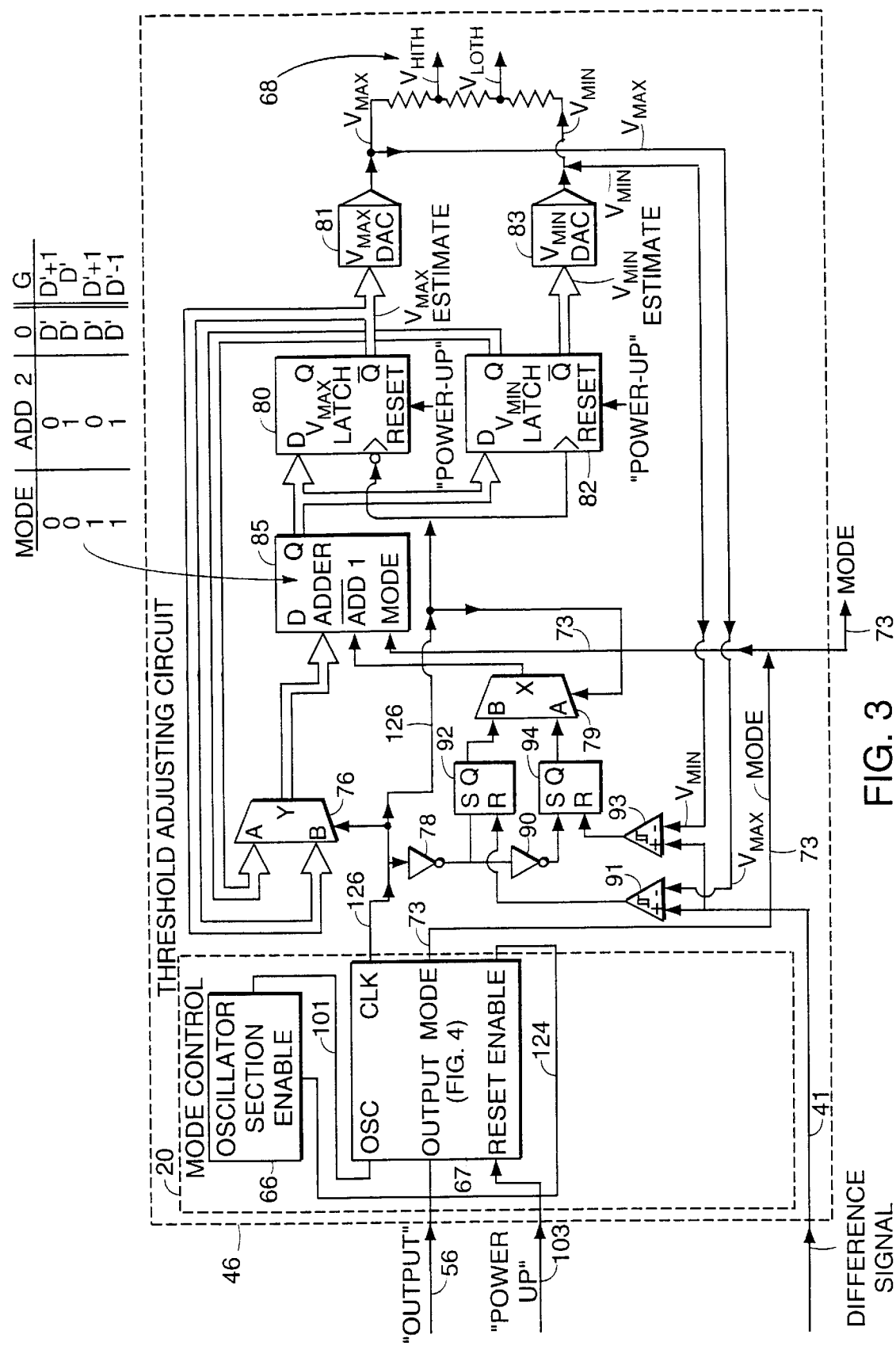
FIG. 3 is a block diagram of a threshold adjusting circuit used in the apparatus of FIG. 1.

The setting of the upper and lower thresholds, $V_{HI\ TH}$ and $V_{LO\ TH}$, respectively, is by the threshold level adjusting circuit 46, shown in more detail in FIG. 3. Such adjustment in the threshold level is to compensate sensor imperfections, such as offsets due to package stresses produced by temperature variations, difference signal overshoot, sensor gain mismatches, etc.). The adaptive threshold level adjusting circuit 46 tracks the maximum positive and maximum negative values (i.e., the peaks 39a, 39b (FIG. 2C) of the difference signal on line 41. The threshold level adjusting circuit 46 (FIG. 3) includes a mode control section 70. The mode control section 70 includes oscillator clock 66 used to clock the circuit 46 during an initial calibration mode (i.e., during a mode used to find the first maximum value, $V_{MAX}$, and first minimum level, $V_{MIN}$, values of the difference signal, i.e., here, for example, after "power-up" or RESET). After this initial calibration mode, the threshold level adjusting circuit 46 operates in a normal (i.e., tracking) operating mode during which the circuit 46 tracks $V_{MAX}$ and $V_{MIN}$ of the difference signal. The threshold levels $V_{HI\ TH}$ and $V_{LO\ TH}$ are establishes as a function of $V_{MAX}$ and $V_{MIN}$. For example, $V_{HI\ TH}=k_1*V_{MAX}$ and $V_{LO\ TH}=k_2*V_{MIN}$, where $k_1$ and $k_2$ are factors less than one. Setting $V_{HI\ TH}$ and $V_{LO\ TH}$ as a function of the difference signal $V_{MAX}$ and $V_{MIN}$ adaptively compensates for errors due to overshoot, gain mismatches and offsets. Here, a simple resistor divider 68 for setting $V_{HI\ TH}$ and $V_{LO\ TH}$ is used. It should also be noted that the threshold level adjusting circuit 46 dynamically calibrates out slowly varying effects (i.e., offsets, mechanical hysteresis, offset drifts, and other temperature effects).

More particularly, the adaptive threshold network 46 (FIG. 3) as noted above, includes a mode control section 70. The mode control section 70 includes the oscillator section 66 and a controller 67. The controller 67 will be described in more detail with FIG. 4. Suffice it to say here, however, that the mode control section 70 produces the mode control signal on MODE signal line 73. The mode control signal on MODE signal line 73 is here a logic 0 during the calibration mode and a logic 1 during the subsequent normal operating mode. After "Power-Up", the apparatus 10 is, as noted above, in an initial calibration mode. In such calibration mode, a logic 0 is produced on MODE signal line 73 until five or six edges 21 (FIG. 2A) have been detected at which point a logic 1 is produced on MODE signal line 73 until the power is removed from the apparatus 10. Waiting until at least four edges 21 insures that the system is fully calibrated, i.e., a maxima has been found.

When a logic 0 is produced on MODE signal line 73 (i.e., during the calibration mode), the OSC input of controller 67 is coupled to the CLK output thereof (i.e, line 126). Thus, during the calibration mode, pulses from the oscillator clock 66 are fed through the controller 67 to: the control input of multiplexer 76; the input to inverter 78; the control input of multiplexer 79; the inverted clock input of D latch section 80; and the non-inverted clock input of D latch section 82. As will be described, the D latch section 80 stores an N-bit estimate of $V_{MAX}$ and D latch section 82 stores an N-bit estimate of $V_{MIN}$. During "Power-On", the D latch sections 80 and 82 are reset to 0. Thus, each of the N-bits at the Q output of D latch section 80 is 0, each one of the N-bits at the Q output of D latch section 82 is 0; and, each one of the N-bits at the $\overline{Q}$ output of D latch section 82 is 1. The Q output of D latch section 80 is converted into a corresponding voltage, $V_{MAX}$, by digital to analog converter (DAC) 81 and the $\overline{Q}$ output of D latch section 82 is converted into a corresponding voltage, $V_{MIN}$, by digital to analog converter (DAC) 83. Thus, at "Power-Up", the estimated voltage $V_{MAX}$ at the Q output of the D latch section 80 is at a minimum value and the estimated voltage $V_{MIN}$ at the $\overline{Q}$ output of D latch section 82 is at a maximum value. During the calibration mode, the contents of D latch section 80 increments until DAC 81 reaches the maximum level of the difference signal peak 39a (FIG. 2C) and the contents of D latch section 82 increments (i.e., $\overline{Q}$ decrements) until DAC 83 reaches the minimum level of the difference signal peak 39b (FIG. 2C). (It is noted that as the contents of D latch section 82 increase, the data at output Q increases while the data at output $\overline{Q}$ decrements from its "Power-Up" initial maximum value.

More particularly, when the clock pulse produced by the oscillator clock 66 is logic 1 (i.e., logic "high"), the "A" input of multiplexer 76 is coupled to the "Y" output thereof and when the clock pulse is logic 0 (i.e., logic "low"), the "B" input of multiplexer 76 is coupled to the "Y" output thereof. The "A" input of multiplexer 76 is fed by the Q output of the $V_{MIN}$ D latch section 82 and the "B" input of multiplexer 76 is fed by the Q output of $V_{MAX}$ D latch section 80. The "Y" output of multiplexer 76 is fed to the D input of an adder 85. The adder 85 is fed the N-bit data at the "Y" output of multiplexer 76 (i.e., an estimate of $V_{MAX}$ or $V_{MIN}$) the MODE signal on line 73, and the "Y" output of multiplexer 79. During the initial calibration mode, i.e., when the MODE signal on line 73 is logic 0, the "Y" output of multiplexer 79 is logic 1 (i.e., when a logic 1 is fed to the "$\overline{ADD}$ 1" input of the adder 85), the N-bit data, D', fed to the D input of adder 85 is the N-bit data at the Q output of such adder 85 (I.e., Q=D'). Also, during the initial calibration mode, i.e., when the MODE signal on line 73 is logic 0, when the "Y" output of multiplexer 79 is logic 0 (i.e., when a logic 0 is fed to the "$\overline{ADD}$ 1" input of the adder 85), the N-bit data, D', at the D input of adder 85 is the N-bit data D' at the Q output incremented by one (i.e., Q=D'+1). Thus, during the calibration mode, when a logic 1 is fed to the "$\overline{ADD}$ 1" input of the adder 85, the data at the D input of adder 85 is passed to the Q output unchanged but when a logic 0 is fed to the "$\overline{ADD}$ 1" input of the adder 85 the data at the D input of adder 85 is incremented by one least significant bit (LSB) and passed to the Q output.

During the normal operating mode, i.e., when the MODE signal on line 73 is logic 1, when the "Y" output of multiplexer 79 is logic 1 (i.e., when a logic 1 is fed to the "$\overline{ADD}$ 1" input of the adder 85), the N-bit data at the Q output of adder 85 is the data, D', at the D input of adder 85 decremented by one LSB (i.e., Q=D'-1). Also, during the normal operating mode, i.e., when the MODE signal on line 73 is logic 1, when the "Y" output of multiplexer 79 is logic 0 (i.e., when a logic 0 is fed to the "$\overline{ADD}$ 1" input of the adder 85), the N-bit data at the Q output of adder 85 is the N-bit data, D', at the D input to the adder 85 incremented by one LSB (i.e., Q=D'+1). A state diagram of the adder 85 is shown in FIG. 3. Thus, during the normal operating mode, when a logic 1 is fed to the "$\overline{ADD}$ 1" input of the adder 85 the data, D', at the D input of adder 85 is decremented by one LSB but when a logic 0 is fed to the "$\overline{ADD}$ 1" input of the adder 85 the data, D', at the D input of adder 85 is incremented by one least significant bit (LSB). Multiplexer 76 enables a single adder to be used to both increment or decrement (or leave unchanged) the estimate of both $V_{MAX}$ and $V_{MIN}$ during different half periods of either the clock signal from the oscillator 66 or the "clock" signal produced at output 56 of apparatus 10 (FIG. 2H) during the normal operating mode. The signal at the "$\overline{ADD}$ 1" input of the adder 85, whether in the calibration mode or the normal mode determines whether the estimate of $V_{MAX}$ is to be incremented by one LSB, decremented by one LSB or to remain unchanged.

The logic signal at the "Y" output of multiplexer 79 (i.e., the "$\overline{ADD}$ 1" input of the adder 85) is produced by the inverter 78, inverter 90, "$V_{MAX\ UP}$" and "$V_{MIN\ DOWN}$" comparators 91, 93 and flip/flops 92, 94. During the calibration mode, the clock pulses from oscillator clock 66 pass to the CLK output of controller 67. When the clock pulse is logic 1, the "B" input of multiplexer 79 is fed to the "$\overline{ADD}$ 1" input of the adder 85. The "B" input of multiplexer 79 is fed with the Q output of the "$V_{MAX\ UP}$" flip/flop 92. The logic 1 produced by inverter 90 is fed to the set (S) input of "$V_{MIN\ DOWN}$" flip/flops 94.

In operation, during the calibration mode, in response to a "Power-Up" signal, the mode control circuit 70 produces a logic 0 on MODE signal line 73. The logic 0 signal on MODE signal line 73 inhibits pulses 50 which may be produced by the peak detector 42 (FIG. 1) from passing through AND gate 52 (FIG. 1) and enables clock pulse to be produced by oscillator clock 66. When the clock pulse produced by the oscillator clock 66 is logic 1 and the level of the difference signal on line 41 is greater than the estimate $V_{MAX}$ (which was reset to 0 by the Power-Up signal), the output of comparator 91 (FIG. 3) becomes a logic 1 and resets flip/flop 92 to a 0. The 0 in flip/flop 92 passes to the "Y" output of multiplexer 79. Because a logic 0 is at the mode input of adder 85 (i.e., on MODE signal line 73), the adder 85 increments by one LSB the estimated value of $V_{MAX}$. This estimated value of $V_{MAX}$ is passed to the D input of adder 85 by multiplexer 76. The output of the adder 85 is then clocked into D latch section 80 on the falling edge of clock 66 thereby increasing the estimate of $V_{MAX}$. During the next half clock pulse period (i.e., when the clock pulse produced by clock oscillator 66 is logic 0), comparator 93 produces a logic 1 if $V_{MIN}$ is larger that the difference signal which should be the case after reset. A logic 1 at the output of comparator 93 resets flip/flop 94 to 0, the logic 0 passes to the "Y" output of multiplexer 79, the contents of adder 85 again increments by 1 LSB the complement of the estimated value of $V_{MIN}$, and the increment contents of adder 85 become latched into D latch section 82; the contents remaining unchanged if the signal on line 41 is greater than $V_{MAX}$ or less than $V_{MIN}$. The Q output bits of D latch section 82 increment but the $\overline{Q}$ output of D latch section 82 decrements thereby reducing the estimate of $V_{MIN}$. The process continues in like manner for two revolutions of the tooth 12 (FIG. 2A). It is noted that here the oscillator 67 produces clock pulses at a rate of 500 KHz while the body 14 revolves at a rate in the order of 8 KHz, or less. Therefore, at the end of the calibration mode the output of $V_{MAX}$ should be at the maximum value of the difference signal and the output $V_{MIN}$ should be at the minimum value of the difference signal.

During the normal operating mode, the logic state of the signal on line 73 (i.e., a MODE signal) becomes a logic 1 thereby enabling pulses 50 produced by the peak detector 42 to pass through AND gate 52 (FIG. 1). Further, the oscillator clock 66 (FIG. 3) is disabled and the output 56 (FIG. 2H) of the apparatus 10 is fed to the "Y" output of multiplexer 79. When the apparatus output 56 is a logic 1, flip/flop 92 is set to logic 1. When the apparatus output 56 goes from a logic 1 to a logic 0 (FIG. 2H), the flip/flop 92 is set to a logic 1. If the difference signal on line 41 is less than the estimated value of $V_{MIN}$ stored in D latch section 83, the flip/flop 94 is reset to a logic 0 and the estimate of $V_{MIN}$ is decremented (i.e., it being noted that to decrement, the estimate is complemented). On the other hand, if the difference signal on line 41 is greater than the estimated value of $V_{MIN}$ stored in D latch section 83, the flip/flop 94 is not reset to 0 and the logic 1 stored therein is fed to the adder 85 thereby incrementing the estimate of $V_{MIN}$ (i.e., it being noted that the complement of the estimate is decremented). In like manner, when the output 56 (FIG. 2H) of apparatus 10 goes from a logic 0 to a logic 1, flip/flop 94 is set to a logic 1. If the difference signal on line 41 is greater than the estimated value of $V_{MAX}$ stored in D latch section 83, the flip/flop 92 is reset to a logic 0 and the estimate of $V_{MAX}$ is incremented thereby increasing the estimate of $V_{MAX}$. On the other hand, if the difference signal on line 41 is less than the estimated value of $V_{MAX}$ stored in the D latch 80, the flip/flop 92 is not reset to 0 and the logic 1 stored therein is fed to the adder 85 thereby decrementing the estimate of $V_{MAX}$.

Thus, referring also to FIG. 1, it is noted that during the normal operating mode, when a pulse 50 is produced by the peak detector 42 in response to edge 21 passing through the reference position, i.e., the sensor axis, the output of peak detector 42 goes from a logic 0 to a logic 1. Thus, if the output of NOR gate 64 is logic 0 (i.e., if the level of the difference signal on line 41 is above $V_{TH\ HI}$ or below $V_{TH\ LO}$) the output of NOR gate 53 will change from a logic 1 to a logic 0 as shown in FIG. 2F. This logic 1 to logic 0 transition by the NOR gate 53 serves as a clock input to D flip/flop 54 (FIG. 1). Further, it is noted that the set (S)/reset (R) flip flop 55 is reset to a logic 0 (i.e., the Q output (DATA), (FIG. 2G) goes from a logic 1 to a logic 0) when the output of comparator 60 goes from a logic 0 to a logic 1. Thus, after the difference signal on line 41 exceeds the threshold $V_{HI\ TH}$, the output of NOR gate 64 switches from a logic 1 to a logic 0 to set flip/flop 55 (i.e., DATA) to a logic 0, as shown in FIG. 2D. The logic 0 on the DATA line fed to the D input of D flip/flop 54 becomes stored in D flip/flop 54 in response to the output of NOR gate 53 switching from a logic 1 to a logic 0 in response to a peak detector 42 produced pulse 50 thereby producing a logic 0 at the output 56 of the apparatus, as shown in FIG. 2H. When the difference signal on line 41 (FIG. 1) falls below the threshold $V_{HI\ TH}$, i.e., after edge 21 passes the sensor axis 33 (FIG. 2A) sufficiently, the output of NOR gate 64 switches from a logic 1 to a logic 0, as shown in FIG. 2D. This positive going transition does not change the reset condition of flip/flop 55. Thus DATA remains at a logic 0, as shown in FIG. 2G. When the edge 22 now passes, the sensors 30, 32, when a pulse 50 is produced by the peak detector 42 in response to edge 22 passing through the reference position, (i.e., the sensor axis 33), the output of peak detector 42 goes from a logic 0 to a logic 1. Thus, if the output of NOR gate 64 is logic 0 (i.e., if the level of the difference signal on line 41 is above $V_{TH\ HI}$ or below $V_{TH\ LO}$) the output of NOR gate 53 will change from a logic 1 to a logic 0 as shown in FIG. 2F. This logic 1 to logic 0 transition by the NOR gate 53 serves as a clock input to D flip/flop 54 (FIG. 1). Further, it is noted that the set (S)/reset (R) flip flop 55 is set to a logic 1 (i.e., the Q output (DATA) (FIG. 2G) goes from a logic 0 to a logic 1) when the output of comparator 62 goes from a logic 1 to a logic 0. Thus, after the difference signal on line 41 falls below the threshold $V_{LO\ TH}$, the output of NOR gate 64 switches from a logic 1 to a logic 0 to reset flip/flop 55 (i.e., DATA) to a logic 1, as shown in FIG. 2D. The logic 1 on the DATA line fed to the D input of D flip/flop 54 becomes stored in D flip/flop 54 in response to the output of NOR gate 53 switching from a logic 0 to a logic 1 in response to a peak detector 42 produced pulse 50 thereby producing a logic 1 at the output 56 of the apparatus, as shown in FIG. 2H. When the difference signal on line 41 rises above the threshold $V_{LO\ TH}$, i.e., after edge 22 passes the sensor axis sufficiently, the output of NOR gate 64 switches from a logic 1 to a logic 0, as shown in FIG. 2D. This positive going transition does not change the reset condition of flip/flop 55. Thus DATA remains at a logic 1, as shown in FIG. 2G.

It is noted that the apparatus 10 combines threshold crossing detection with peak detection. That is, referring to FIG. 2E', a condition is shown where the second peak in the difference signal on line 41 is not detected by the peak detector 42. Under such condition, the NOR gate 53 will change from a logic 1 to a logic 0 when the output of NOR gate 64 changes from a logic 0 to a logic 1 (FIGS. 2F' and 2H'). The logic 1 to logic 0 transition at the output of NOR gate 64 at time T (FIG. 2F') clocks into the D flip/flop 54 the logic 1 on the DATA line (FIG. 2G) thereby changing the logic 0 on output 56 to a logic 1, as shown in FIG. 2H'. Thus, while passing of the edge 22 through the sensor axis 33 has not been accurately determined, the event (i.e, the fact that the edge 22 has passed by the sensors 30, 32) is detected. The error in detection, A, is shown in FIG. 2H'. There are two reasons for doing this. First, because peak detection is an AC function, it does not permit the DC operation required in some applications. For example, if the difference signal frequency is too slow for the peak detector 42 to operate, the threshold circuit 44 still results in an output 56 which indicates the tooth 22 crossing event, albeit slightly inaccurate. Thus, while not accurately detecting a tooth-notch edge transition, a transition event is still detected. This fail-safe mechanism ensures that all tooth-notch edge transition events are detected regardless of speed or accuracy. Second, the peak detector 42 is only enabled when the threshold crossing concludes that a tooth-notch edge transition event is occurring. This keeps false peaks, due to noise or overshoot, from producing an output when an edge transition event is not present.

It should be noted that at "Power On", the apparatus detects whether one of the sensors 30, 32 is over a tooth 12 or a notch 16. A "Power On" signal may come from an external input, not shown, or from an internally produced pulse generated by a circuit, not shown, which detects when power is applied to the apparatus 10. If the field in the sensor 32 is larger than a predetermined threshold level, here "VStart", the sensor 32 is considered to be over the tooth 12 and if smaller than such predetermined threshold, then sensor 32 is considered to be over a notch 16. Thus, when the power is applied to the apparatus, the apparatus is able to determine the gear tooth state and sets the apparatus output 56 accordingly.

More particularly, a start-up circuit 150 is provided for detecting whether the field in the sensor 30, 32 is larger than the predetermined threshold level, "VStart". The start-up circuit 150 includes a comparator 154 having its non-inverting input coupled to the output of one of the sensors, 30, 32, here to sensor 32. The inverting input of the comparator is fed by the threshold "VStart". The output of the comparator is fed to AND gate 151 and to AND gate 152 through an inverter 153. The Power-up signal is fed to the pair of AND gates, as shown. The output of AND gate 151 is fed to the reset terminal, R, of flip/flop 54 and the output of AND gate 152 is fed to the set terminal, S, of flip/flop 54.

In operation, the start-up circuit 150 detects if the apparatus is over a tooth 12 or a notch 16 at "power On", and sets the initial state of the output 56 accordingly, here a logic "low" if over a tooth 12 and a logic "high" if over a notch 16. At "power-up" (i.e., the "power-up" signal is logic "high"), the output of comparator 154 is passed to the set terminal (S) and reset terminal (R) of flip/flop 54 via the AND gates 151 and 152. If sensor 32 is over a tooth 12, the output of comparator 154 will be a logic "high" which will reset the flip/flop 54 output 56 to logic "low". Conversely, if sensor 32 is over a notch 16, the output of comparator 154 will be logic "low" which will set the flip flop 54 output 56 to logic "high". Once the "power-up" sequence is over (i.e., "power-up" is logic "low"), the comparator 54 is blocked from setting or resetting flip/flop 54 by AND gates 151, 152, thus disabling the start-up circuit 150. Reference is also made to copending patent application Ser. No. 08/601,304 filed Feb. 16, 1996 and assigned to the same assignee as the present invention, the entire subject matter thereof being incorporated herein by reference.

Figure 4:
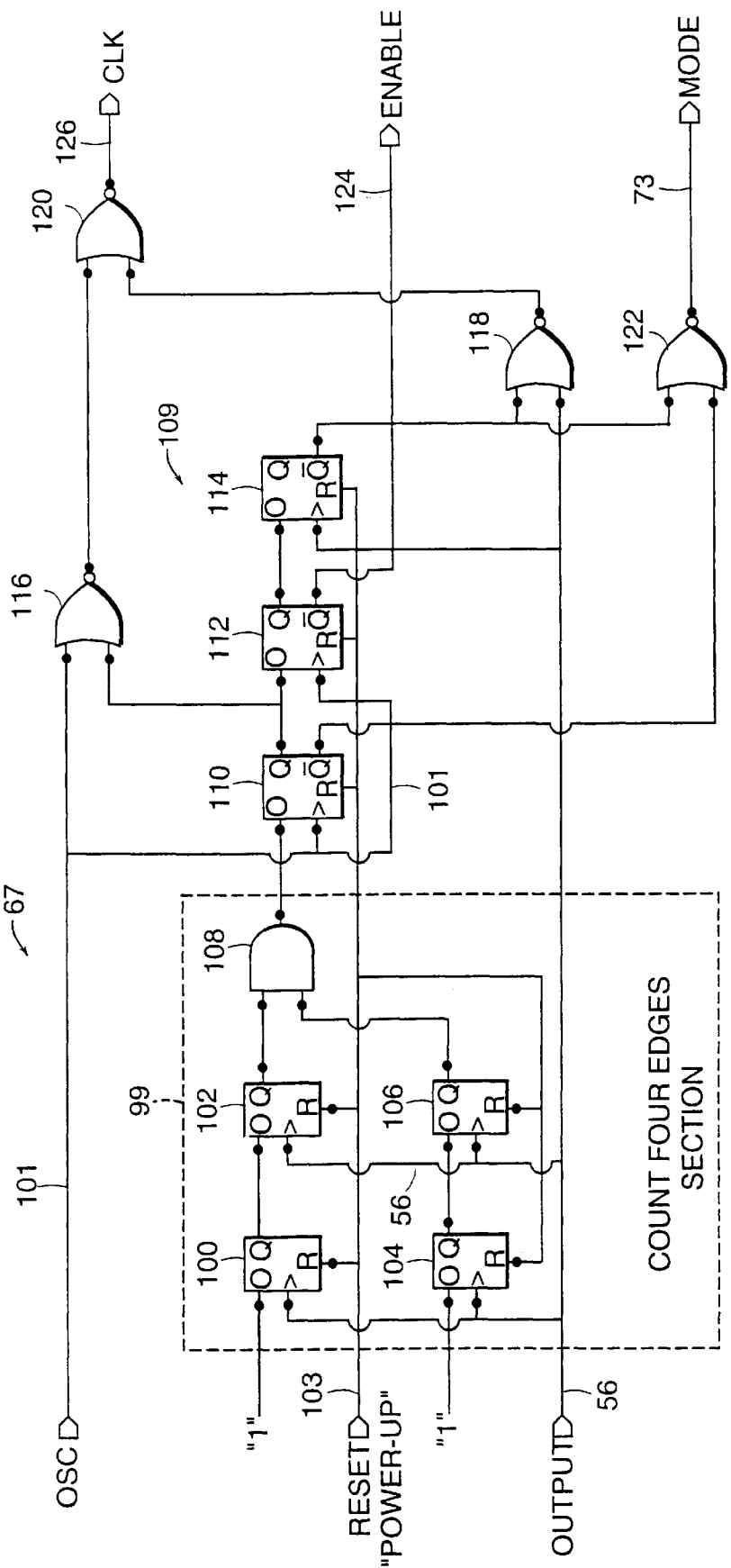
FIG. 4 is a block diagram of a controller used in the threshold adjusting circuit of FIG. 3.

Referring now to FIG. 4, the controller 67 is shown to include a count four edge section 99 fed by the "Power-UP" signal on line 103, the signal on output 56, and fixed logic 1 levels, as indicated. The count four edge section 99 includes a first set of two serially connected flip/flops 100, 102 and a second set of two serially connected flip/flops 104, 106. The first flip/flop 100, 104 in each set is fed at the D input thereof the fixed logic 1 level. The last flip/flop 102, 106 in each set is coupled to inputs of AND gate 108, as shown. The clock inputs of the two sets of flip/flops 100–106 are fed by the output pulses produced at output 56. The reset inputs of the two sets of flip/flops 100–106 are fed by the "Power-Up" signal on line 103.

The output of the count four clock edges section 99 (i.e., the output of AND gate 108) is fed to a circuit 109 which seamlessly transitions between use of the clock pulses from the oscillator section 66 and the pulses at the output line 56; it being noted that these two pulses are asynchronous. Circuit 109 includes three serially connected flip/flops 110, 112 and 114. Flip/flops 110 and 112 are clocked by the clock pulses on line 101 from the oscillator section 66 and flip/flop 114 is clocked by the pulses on output line 56. A NOR gate 116 is fed by the clock pulses on line 101 and the Q output of flip/flop 110. A second NOR gate 118 is fed by the $\overline{Q}$ output of flip/flop 114 and the pulses on output line 56. The output of NOR gate 116 and the output of NOR gate 118 are fed to a third NOR gate 120 which produces the pulses on line 126 for multiplexer 76 (FIG. 3), inverter 78, and $V_{MAX}$ latch 80 and $V_{MIN}$ latch 82. The $\overline{Q}$ output of flip/flop 112 provides an enable signal on line 124 for the oscillator section 66 (FIG. 3). The $\overline{Q}$ output of flip/flop 114 is also fed to one input of NOR gate 122; a second input of such NOR gate 122 being fed by the $\overline{Q}$ output of flip/flop 110. The output of NOR gate 122 provides the MODE signal on line 73.

In operation, a logic "high" signal on RESET (i.e., on "Power-Up") initializes all flip/flop 100, 102, 108, 110 112 and 114 Q outputs to logic 0. It is noted that under this reset condition, the MODE signal on line 73 is logic "low" (i.e., logic 0, signalling a calibration phase), and the ENABLE signal on line 124 is logic "high" (enabling the oscillator section 66 (FIG. 3). The clock pulses produced by the oscillator section 66 on line 101 are multiplexed through NOR gates 116 and 120 which allows calibration at the oscillator section 66 clock pulse frequency. The output signal on line 56 is blocked from line 126 by the logic "low" signal at the $\overline{Q}$ output of flip/flop 114.

The process continues until the fourth edge of the pulse on output line 56 (i.e., two rising edges and two falling edges) occur as determined by flip/flops 102, 106 to set the output of AND gate 108 logic "high". Since the pulses on the output line 56 and the pulses produced by the oscillator section 66 are asynchronous, there is a potential glitch at the Q output of flip/flop 110 when the output of AND gate 108 goes logic "high". Since the glitch is a logic 0-to-logic 1-to- logic 0 transition, and the clock pulse produced by the oscillator section 66 just transitioned logic "high", no glitch is produced on the clock line 126. Once the Q output of flip/flop 110 goes (i.e., stays) logic "high", the oscillator section 66 is decoupled from driving clock on line 124 by the logic 1 on the Q output of flip/flop 110 and the signal on the clock line 126 is logic "high". After one oscillator section 66 produced clock pulse cycle, the Q output of flip/flop 110 goes logic "high", the Q output flip/flop 112 goes logic "high". Since the Q output of flip/flop 110 is synchronous with the oscillator section 66 produced clock pulses, no glitch is produced on the Q output of flip/flop 112. When $\overline{Q}$ of flip/flop 112 goes logic "low" (i.e., the signal on enable line 124 goes logic "low"), the oscillator section 66 is disabled. Since the oscillator section 66 operation is not required at this point, it is desirable to disable its operation. It should be noted that the signal on MODE signal line 73 is still logic "low" denoting that the calibration cycle is still in effect.

The output of flip/flop 112 and the pulses on output line 56 are asynchronous so that there is a potential glitch at the Q output of flip/flop 114. Since the glitch is a logic 0-to-logic-1-to-logic 0 transition, and the signal on output line 56 just transitioned logic "high", no glitch is produced at the output of NOR gate 118 on line 126. In theory a glitch is not possible, since the maximum operating frequency of the pulses on line 56 is typically 8 kHz and the clock pulses produced by the oscillator section 66 on line 101 is typically about 500 Khz. Thus, the oscillator section 66 will be disabled long before any two successive edges appear on the output line 56. Therefore, on the rising edge of a pulse on the output line 56 following the Q output of the flip/flop 112 going logic "high", the Q output of flip/flop 114 will go logic "high", which will therefore multiplex the pulses on the output line 56 to line 126 through the NOR gates 118, 120, and the signal on the MODE signal line 73 will be set logic "high" signalling normal operation. Also, it should be noted that the pulse on line 126 does not change state when the Q output of flip/flop 114 went logic "high", hence the signal on MODE signal on line 73 goes logic "high" one-half cycle (of the pulse on line 56) earlier than the pulse on line 126 going logic "low".

The following should be noted: First, line 126 is electrically decoupled from the oscillator section 66 and line 56 for at least one cycle of the clock pulse of oscillator section 66, thus ensuring that the signal on line 126 never has a pulse width less than that produced on line 101; and, second, that both the multiplexing operations (i.e., multiplexing out the pulses on line 101 and multiplexing in the pulses on line 56) are seamless, producing no glitches or pulse widths less than the pulses on lines 101 or 56.

Normal operation does not start until at least four edges are produced on line 56 to ensure that the system is fully calibrated (i.e., $V_{MIN}$ and $V_{MAX}$ have found the maximum excursions of the signal on line 41. Additionally, the peak detector 42 (FIG. 1) is disabled during the calibration mode by the signal on line 73 to keep unwanted peaks from switching the output on line 56 incorrectly before calibration is complete.

Other embodiments are within the spirit and scope of the appended claims. For example, while one tooth is shown, the apparatus may operate with multiple teeth. Further, the wheel may be magnetic with alternating north-south poles instead of using a separate magnet.

What is claimed is claimed:

1. Apparatus for detecting passage between a point on a body and a reference position, comprising:
    a pair of magnetic field sensors disposed laterally along a direction of movement between the body and the reference position;
    a magnet disposed at the reference position to provide a magnetic field through the body and the pair of magnetic field sensors, the magnitude of the field passing through the body and the pair of sensors being related to the relative position between the point on the body and the reference position, each one of the sensors producing an output signal related to the magnitude of the magnetic field passing such sensor;
    a differencing circuit fed by the output signal produced by each one of the sensors for producing a difference signal having a peak when the point of the body is positioned between the pair of sensors;
    a peak detector for detecting the peak in the difference signal and for producing a peak detection signal indicating detection of such peak;
    a threshold circuit fed by the differencing signal for producing a gating signal when the magnitude of the difference signal exceeds a threshold level;
    a gate, the gating signal enables the peak detector produced peak detection signal to pass through the gate to an output of the apparatus when the gating signal indicates the magnitude of the difference signal exceeds the threshold such peak detection signal being inhibited from passing through the gate to the output of the apparatus in the absence of such gating signal; and
    a threshold level adjusting circuit for establishing the threshold level in accordance with the magnitude of the difference signal.

2. The apparatus recited in claim 1 wherein the threshold level adjusting circuit determines the maximum value of the magnitude of the difference signal in establishing the threshold level.

3. The apparatus recited in claim 1 wherein the threshold level adjusting circuit tracks the maximum value of the difference signal.

4. Apparatus for detecting a tooth of a body, such tooth having an edge terminating in a notch, such tooth and notch being disposed along an edge of the body, such apparatus, comprising:
    a pair of magnetic field sensors disposed laterally along a direction of movement between the body and the pair of magnetic field sensors;
    a magnet disposed at the reference position to provide a magnetic field through the body and the pair of magnetic field sensors, the magnitude of the field passing through the body and each one of the pair of sensors being related to the relative position between the tooth and such one of the pair of sensors, each one of the pair of sensors producing an output signal related to the magnitude of the magnetic field passing such sensor;
    a differencing circuit fed by the output signal produced by each one of the sensors for producing a difference signal having a peak when the tooth is positioned between the pair of sensors;
    a peak detector for detecting the peak in the difference signal and for producing a peak detection signal indicating detection of such peak;
    a threshold circuit fed by the differencing signal for producing a gating signal when the magnitude of the difference signal exceeds a threshold level;
    a gate, the gating signal enables the peak detector produced peak detection signal to pass through the gate to an output of the apparatus when the gating signal indicates the magnitude of the difference signal exceeds the threshold such peak detection signal being inhibited from passing through the gate to the output of the apparatus in the absence of such gating signal; and
    a threshold level adjusting circuit for establishing the threshold level in accordance with the magnitude of the difference signal.

5. The apparatus recited in claim 4 wherein the threshold level adjusting circuit determines the maximum value of the magnitude of the difference signal in establishing the threshold level.

6. The apparatus recited in claim 4 wherein the threshold level adjusting circuit tracks the maximum value of the difference signal.

7. Apparatus for detecting a tooth of a body, such tooth having an edge terminating in a notch, such tooth and notch being disposed along an edge of the body, such apparatus, comprising:
    a pair of Hall effect cells disposed adjacent to, and laterally disposed along, the edge of the body;

a magnet positioned to provide a magnetic field through the edge of the body and the Hall effect cells, the magnitude of the field passing through the Hall effect cells being related to the relative position between the tooth and the Hall effect cells, such Hall effect cells producing an output voltage related to the magnitude of the magnetic field passing through the cell;

a differencing circuit fed by the pair of Hall effect cell produced voltages for producing a difference signal having a peak when the edge of the tooth is positioned between the pair of Hall effect cells;

a peak detector for detecting the peak produced by the difference signal and for producing a peak detection signal indicating detection of such peak;

a threshold circuit fed by the differencing signal for producing a gating signal when the magnitude of the difference signal exceeds a threshold level;

a gate, the gating signal enables the peak detector produced peak detection signal to pass through the gate to an output of the apparatus when the gating signal indicates the magnitude of the difference signal exceeds the threshold such peak detection signal being inhibited from passing through the gate to the output of the apparatus in the absence of such gating signal;

a threshold level adjusting circuit responsive to the difference signal for tracking maxima in the difference signal and for establishing the threshold level of the threshold circuit in accordance with the tracked difference signal maxima.

8. The apparatus recited in claim 7 wherein the threshold level adjusting circuit includes:

an adder network for producing an estimate of the maximum value of the difference signal;

a comparator for comparing the estimate of the difference signal with the difference signal; and circuitry for incrementing or decrementing the estimate of the maximum value of the difference signal in accordance with the comparison made by the comparator.

9. The apparatus recited in claim 7 wherein the threshold level adjusting circuit includes:

an oscillator;

circuitry for incrementing the estimate of the difference signal in response to pulses produced by the oscillator during an initial calibration mode and for incrementing or decrementing the estimate of the maximum value of the difference signal in accordance with the comparison made by the comparator during a subsequent tracking mode.

10. The apparatus recited in claim 7 wherein the threshold circuit fed by the differencing signal produces a termination gating signal when the magnitude of the difference signal is less than a pre-determined minimum threshold level; and wherein the threshold level adjusting circuit is responsive to the difference signal for tracking minima in the difference signal and establishes the pre-determined minimum threshold level of the threshold circuit in accordance with the tracked difference signal minima.

11. The apparatus recited in claim 10 wherein the threshold level adjusting circuit includes:

an adder network for producing an estimate of the maximum and minimum values of the difference signal;

a comparator for comparing the estimate of the maximum value of the difference signal and the estimate of the minimum value of the difference signal with the difference signal; and circuitry for incrementing or decrementing the estimate of the maximum value and the estimate of the minimum value of the difference signal in accordance with the comparison made by the comparator.

12. The apparatus recited in claim 10 wherein the threshold level adjusting circuit includes:

an oscillator;

circuitry for incrementing the estimate of the difference signal in response to pulses produced by the oscillator during an initial calibration mode and for incrementing or decrementing the estimate of the maximum value and minimum value of the difference signal in accordance with the comparison made by the comparator during a subsequent tracking mode.

13. The apparatus recited in claim 1 including a start-up circuit for initializing the output signal of the apparatus in accordance with an initial orientation of the reference position and the point on the body.

14. The apparatus recited in claim 4 including a start-up circuit for initializing the output signal of the apparatus in accordance with an initial orientation of the tooth and the notch.

15. The apparatus recited in claim 7 including a start-up circuit for initializing the output signal of the apparatus in accordance with an initial orientation of the tooth and the notch.

* * * * *